(12) United States Patent
Ozawa

(10) Patent No.: US 6,616,282 B2
(45) Date of Patent: Sep. 9, 2003

(54) OPTICAL PART MOUNTING STRUCTURE AND PROJECTOR

(75) Inventor: Takaaki Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/106,113

(22) Filed: Mar. 27, 2002

(65) Prior Publication Data

US 2002/0154275 A1 Oct. 24, 2002

(30) Foreign Application Priority Data

Mar. 28, 2001 (JP) ........................................ 2001-092585

(51) Int. Cl.[7] ........................ G03B 21/00; G03B 21/28; G03B 21/22
(52) U.S. Cl. ............................ 353/33; 353/81; 353/119
(58) Field of Search ............................. 353/30, 33, 81, 353/82, 101, 111

(56) References Cited

U.S. PATENT DOCUMENTS 5,676,442 A * 10/1997 Fujimori .................... 353/119
5,749,641 A * 5/1998 Brice et al. .................. 353/81
5,909,944 A * 6/1999 Yajima et al. ................ 353/81
6,095,653 A * 8/2000 Yajima ....................... 353/33
6,147,802 A 11/2000 Itoh et al.
6,334,686 B1 * 1/2002 Shiraishi et al. .............. 353/57

FOREIGN PATENT DOCUMENTS

JP 08-304739 11/1996

* cited by examiner

*Primary Examiner*—Russell Adams
*Assistant Examiner*—Andrew Sever
(74) *Attorney, Agent, or Firm*—Oliff & Berridge, PLC

(57) ABSTRACT

The invention provides an optical part mounting structure which makes it possible to easily replace an optical part including a light-modulating device (liquid crystal panel) and a prism. An optical part having a liquid crystal panel and a cross dichroic prism integrally formed with each other is secured so as to be suspended from the lower surface sides of mounting members. The mounting members are removably mounted to mounting portions at the top portion side of a lower light guide. Therefore, when the optical part is replaced along with the mounting members, it is not necessary to insert a driver that removes and re-screws a screw into the inside of the lower light guide. Consequently, it is no longer necessary to be concerned with scratching other optical parts inside the light guide with the driver, thereby making it possible to easily perform a replacement operation.

5 Claims, 13 Drawing Sheets

OPTICAL PART

[FIG. 1]
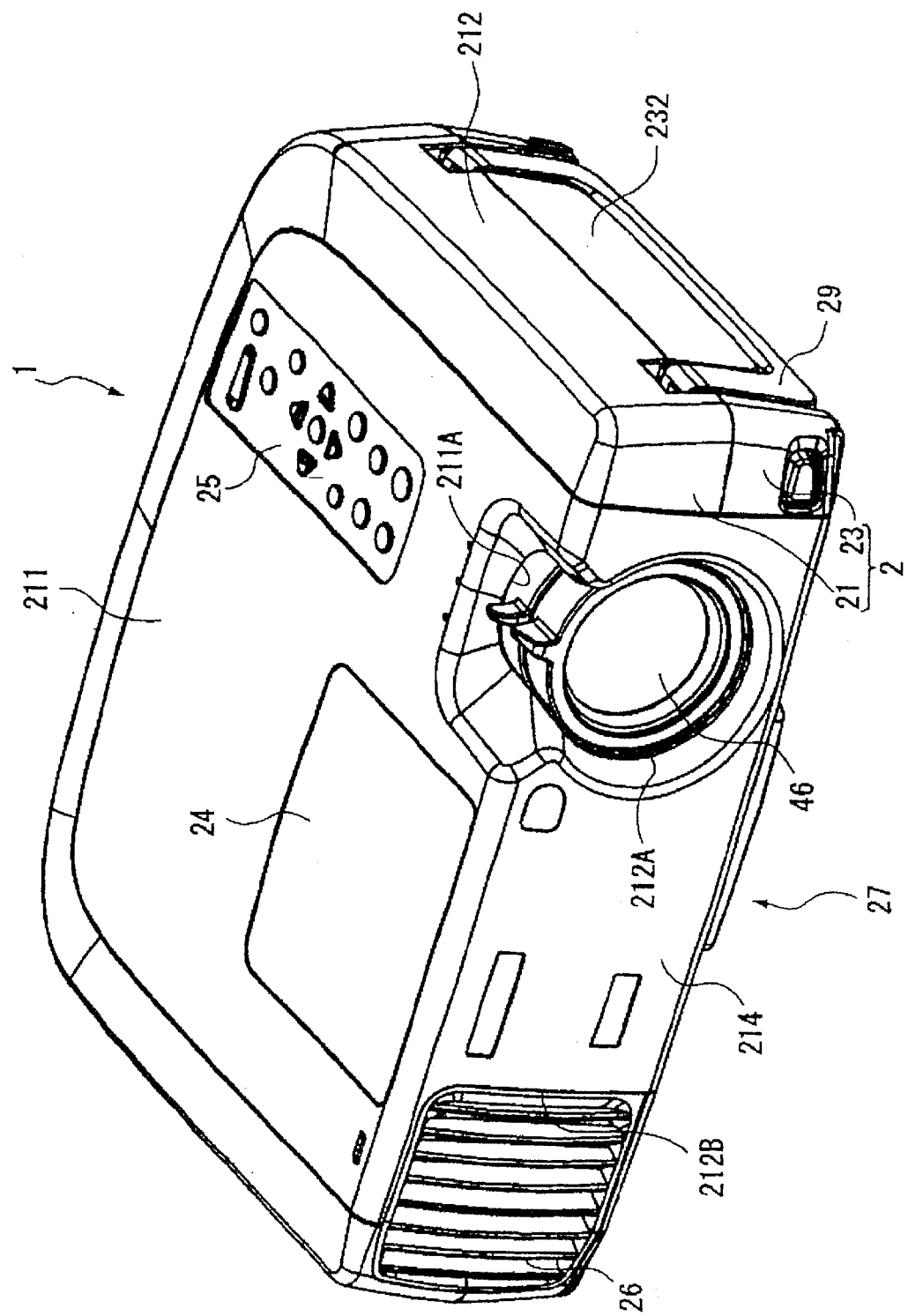

[FIG. 2]
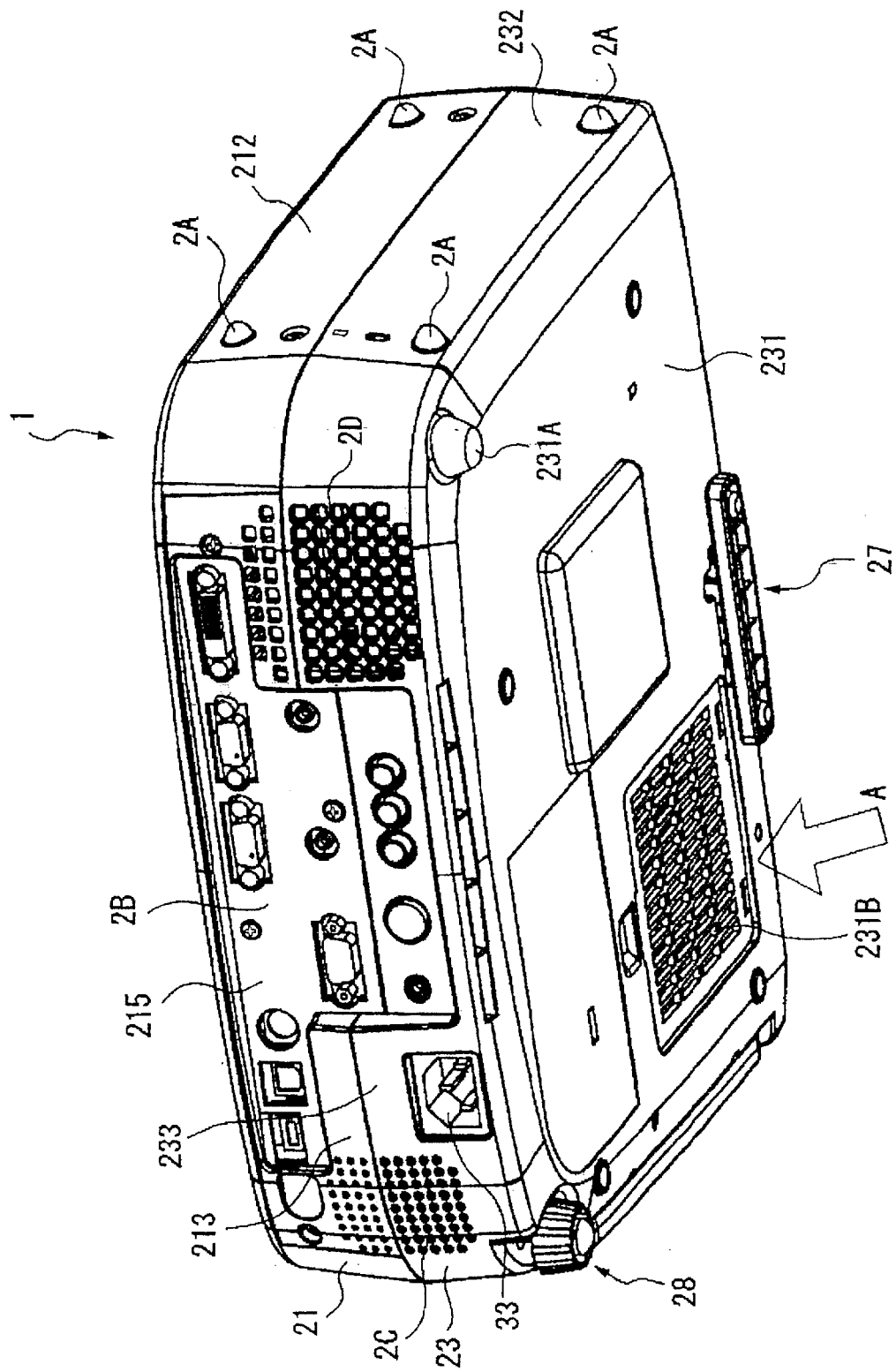

[FIG. 3]
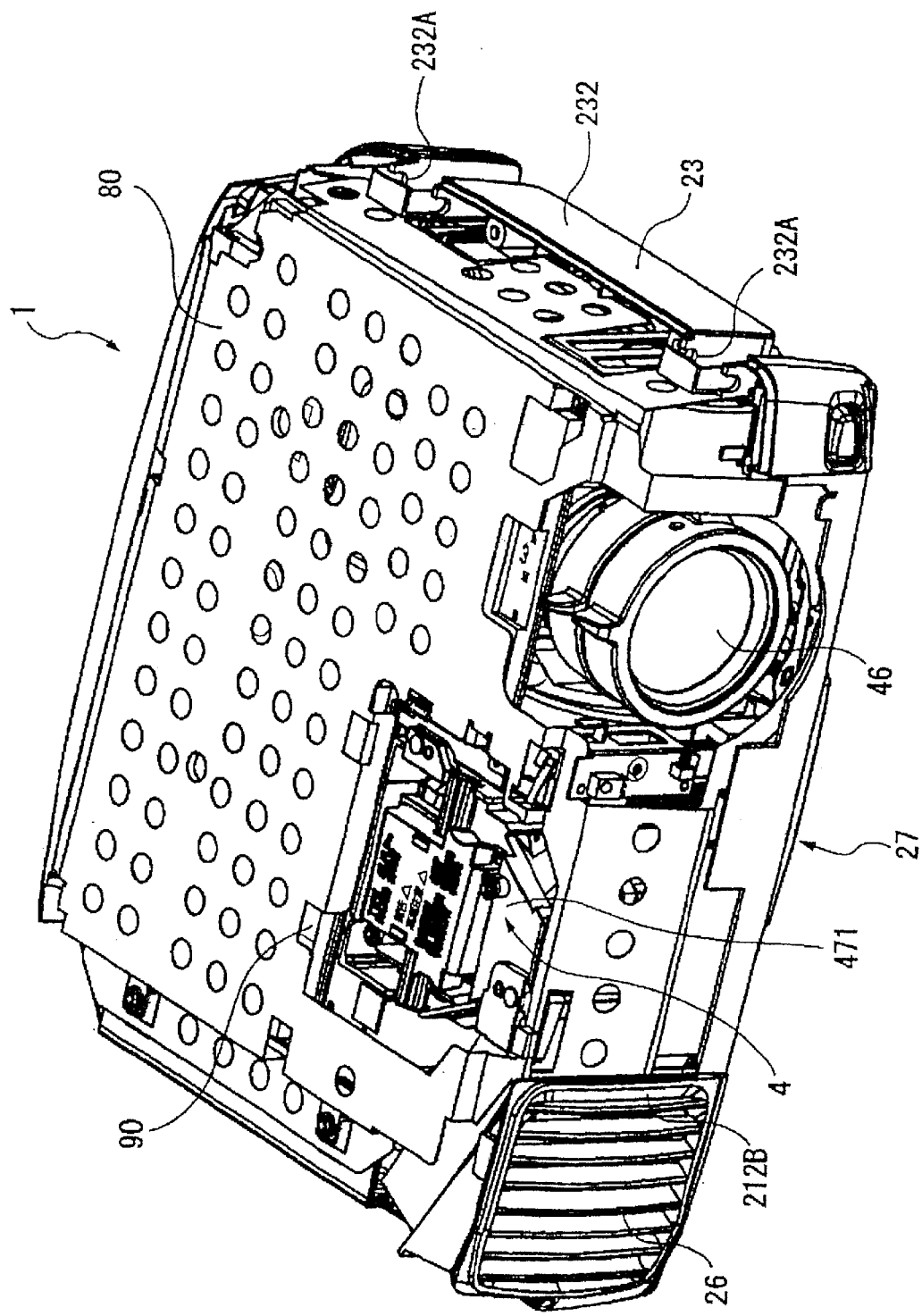

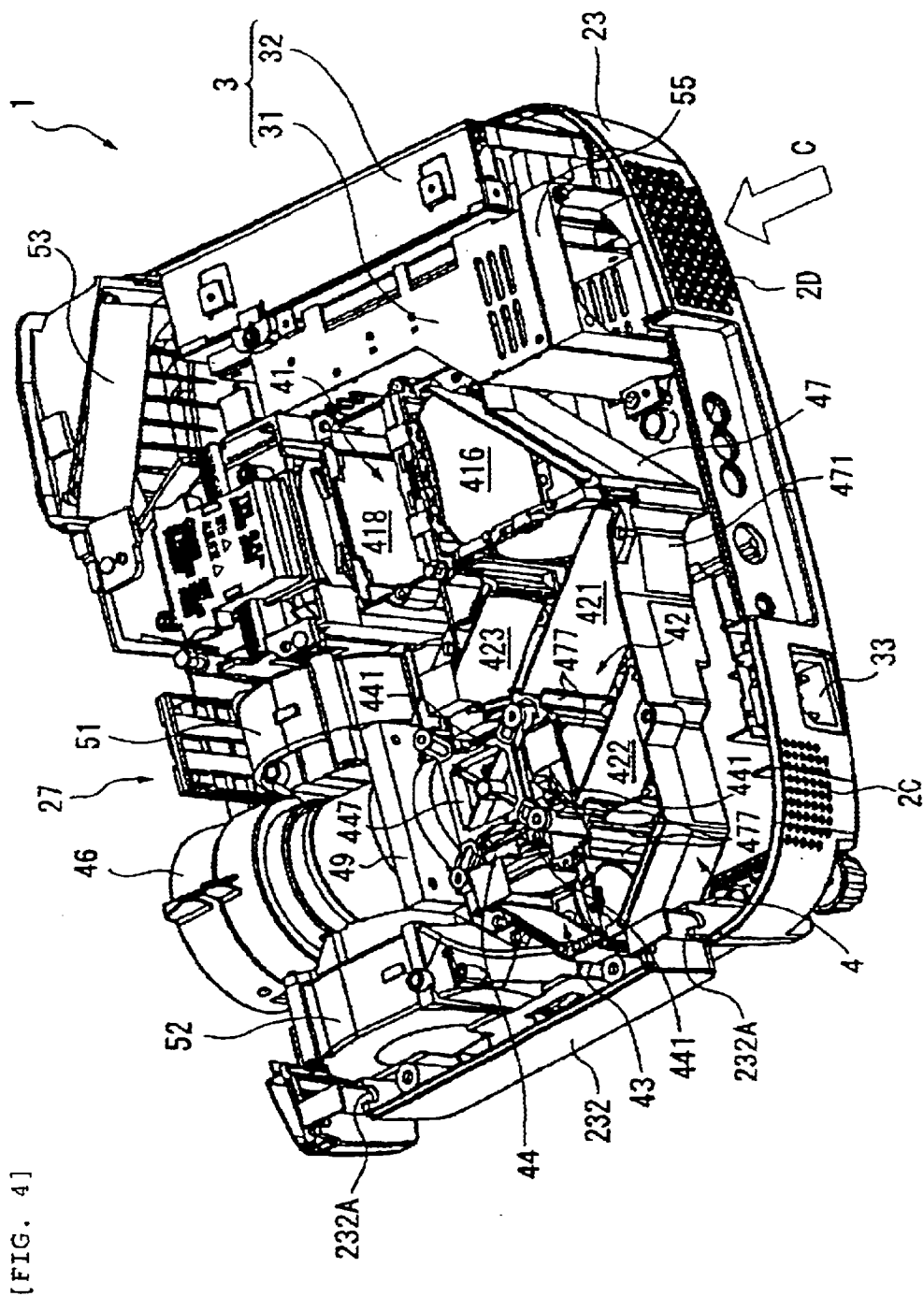
[FIG. 4]

[FIG. 5]
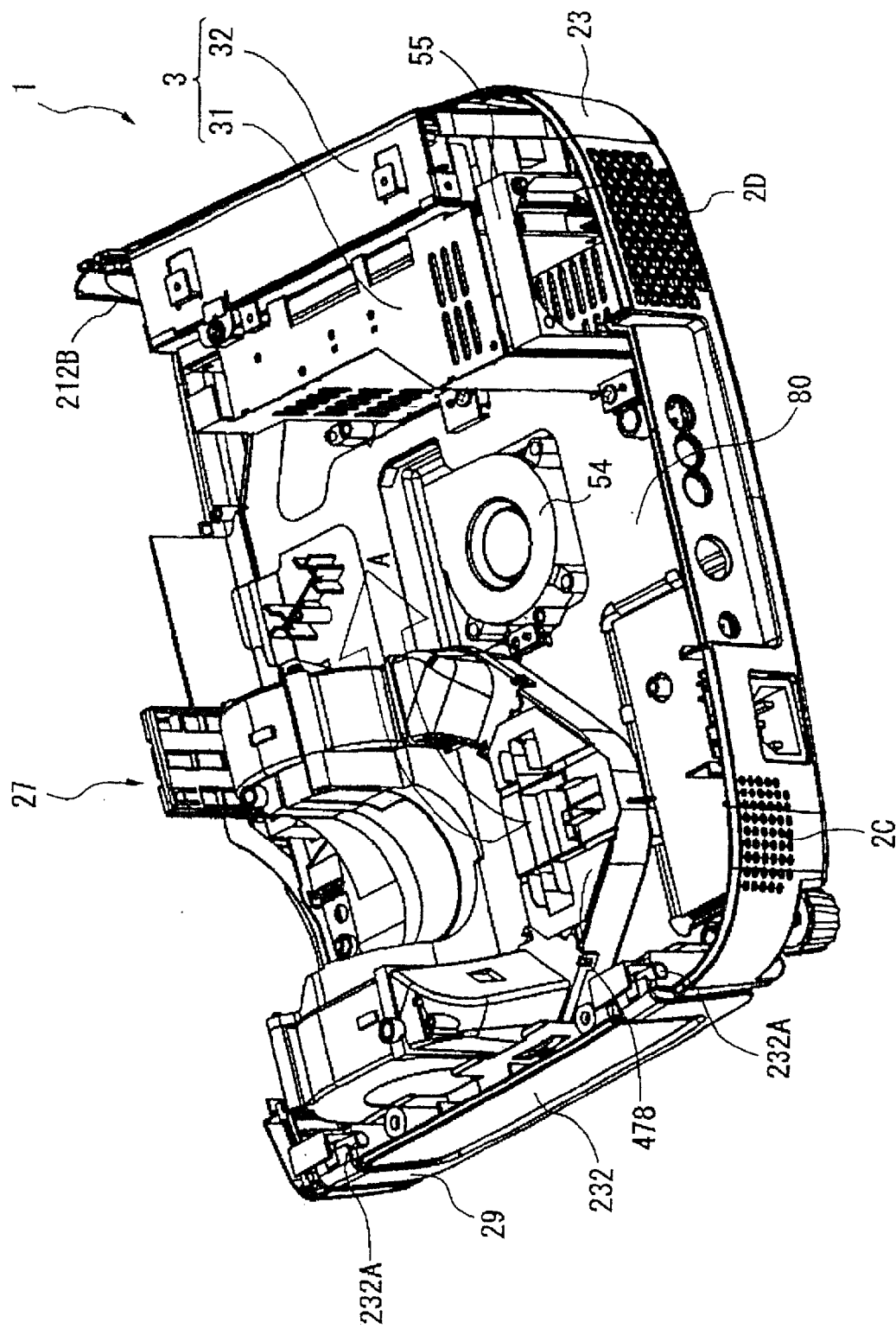

[FIG. 6]
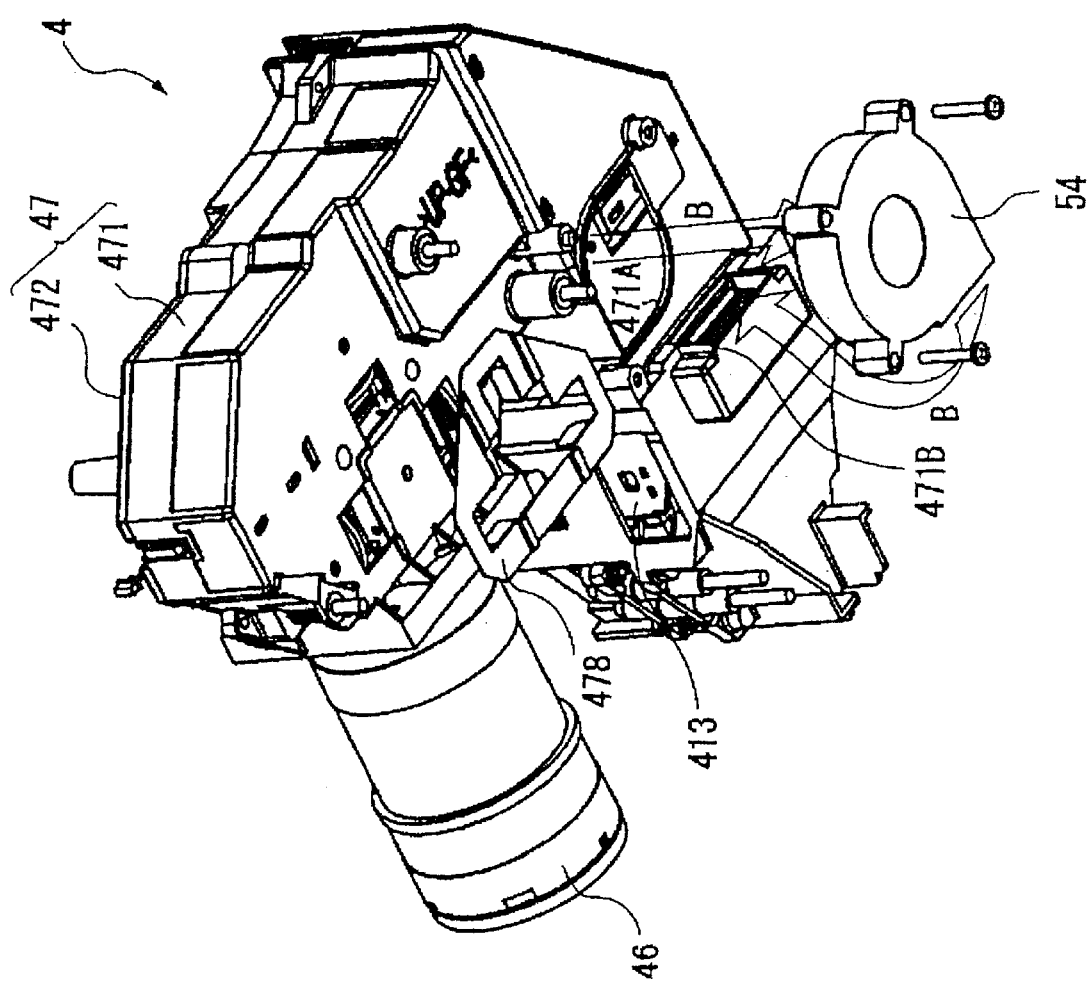

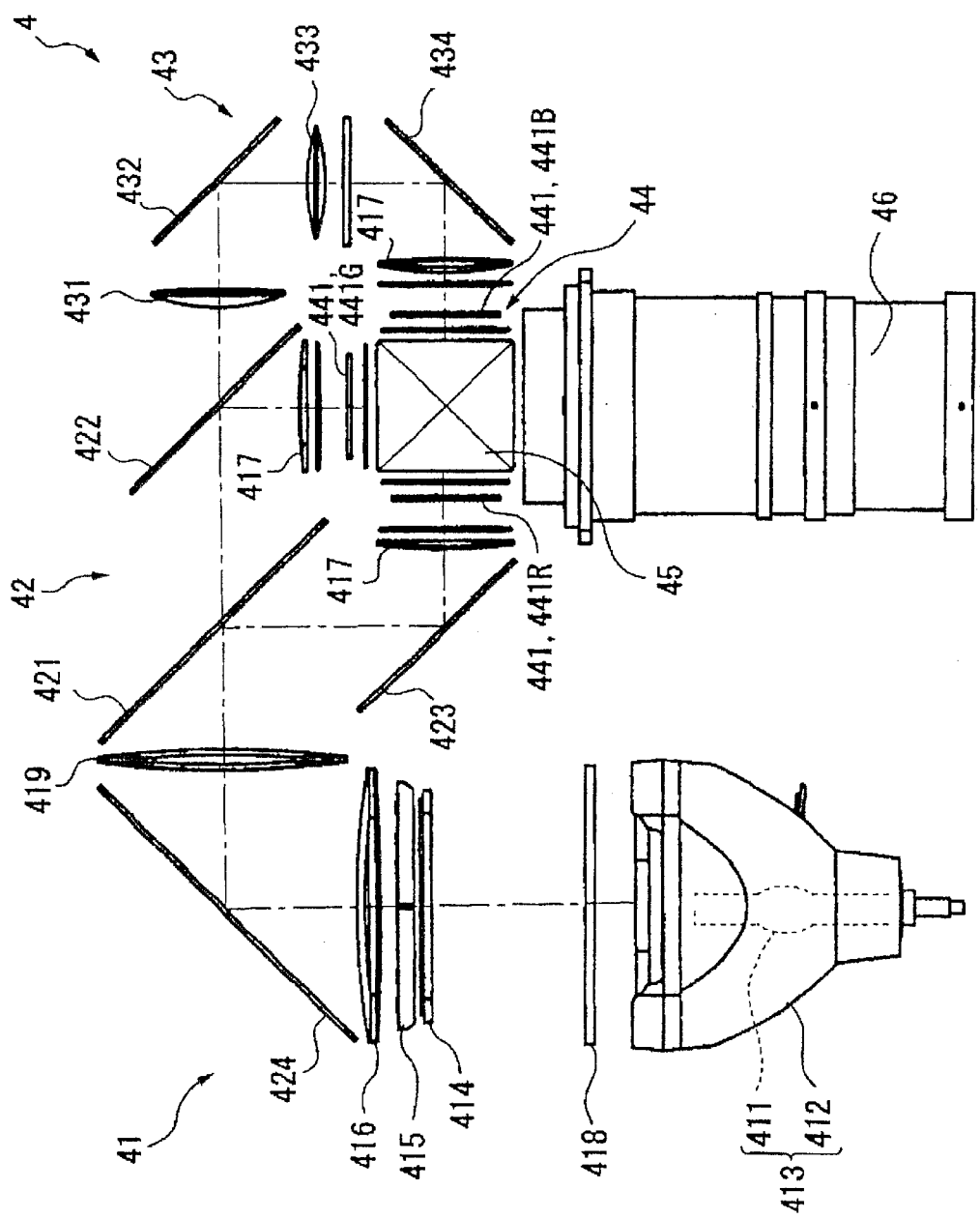
[FIG. 7]

[FIG. 8]
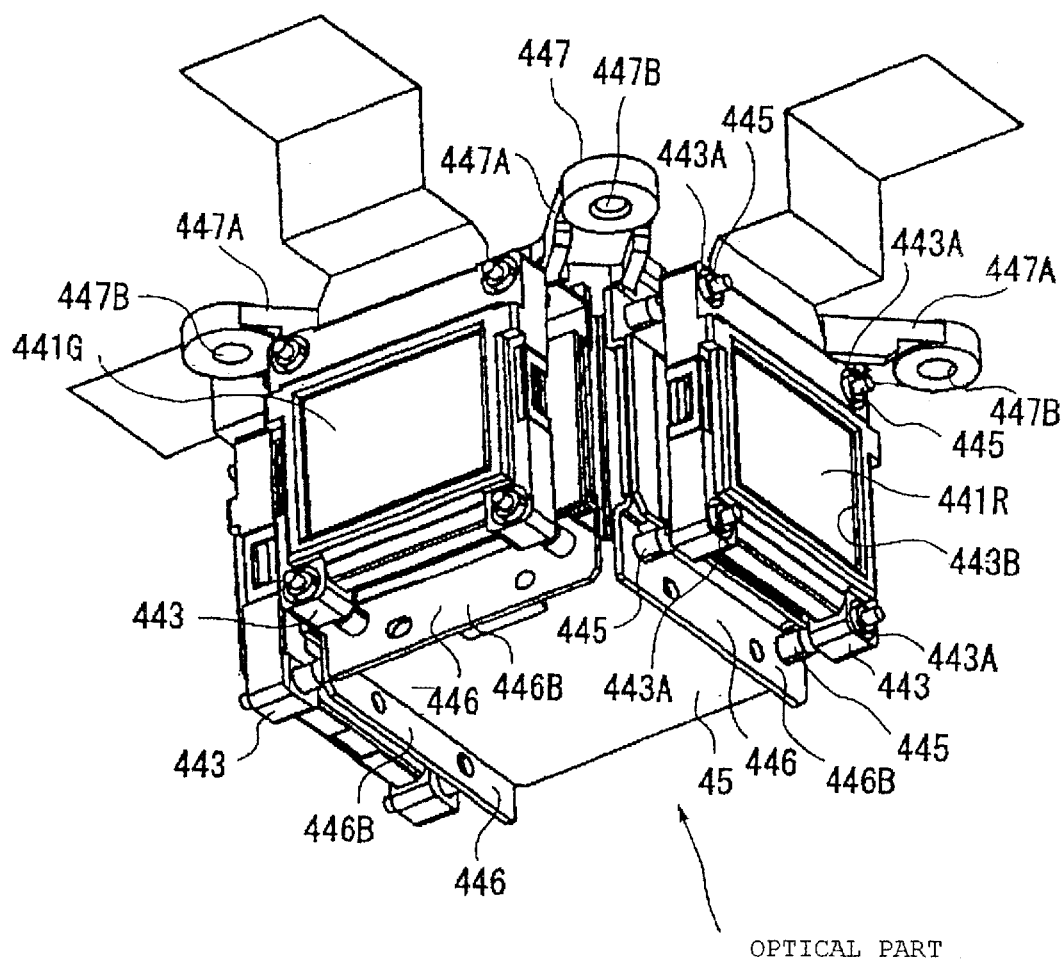

[FIG. 9]
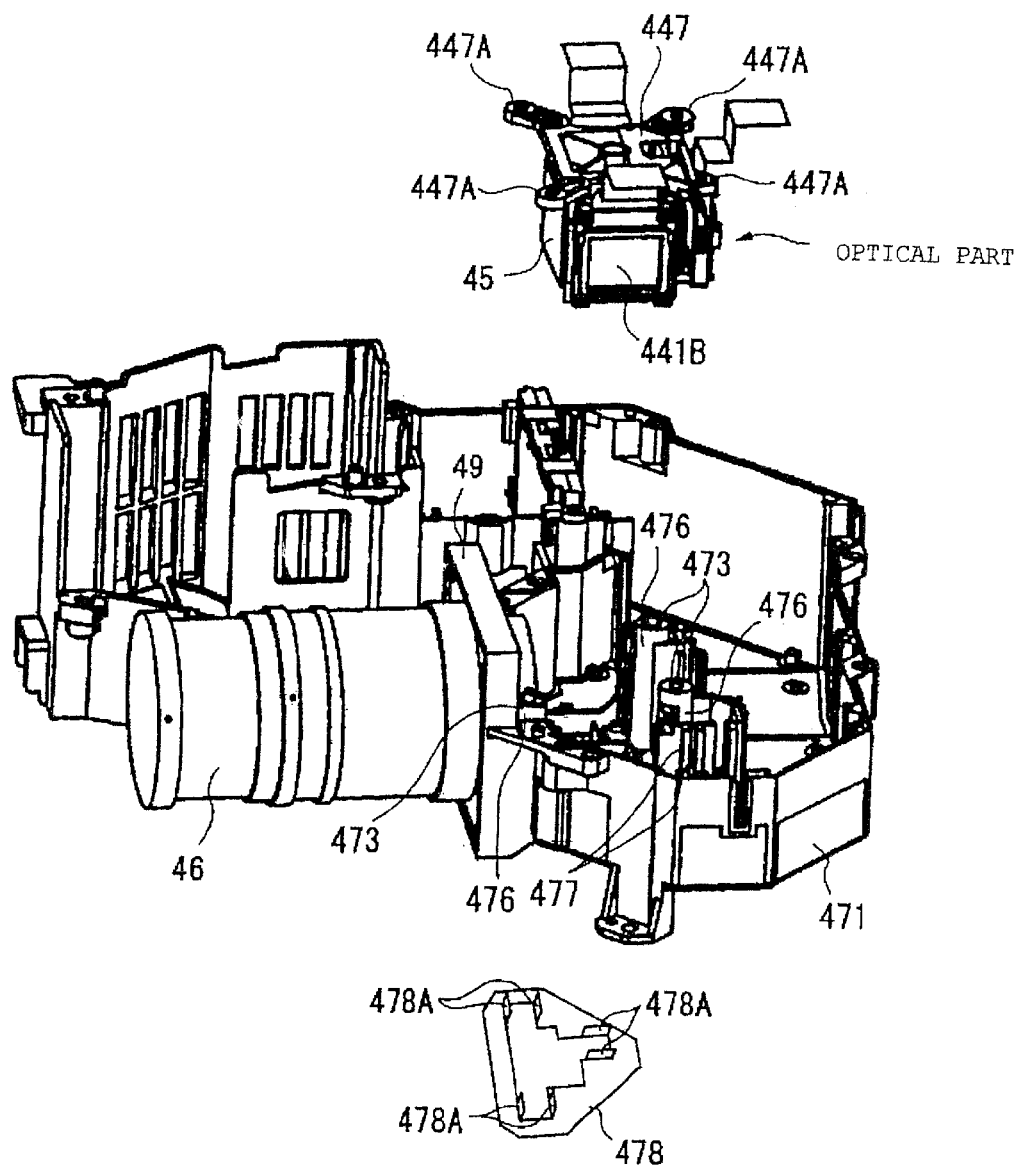

[FIG. 10]
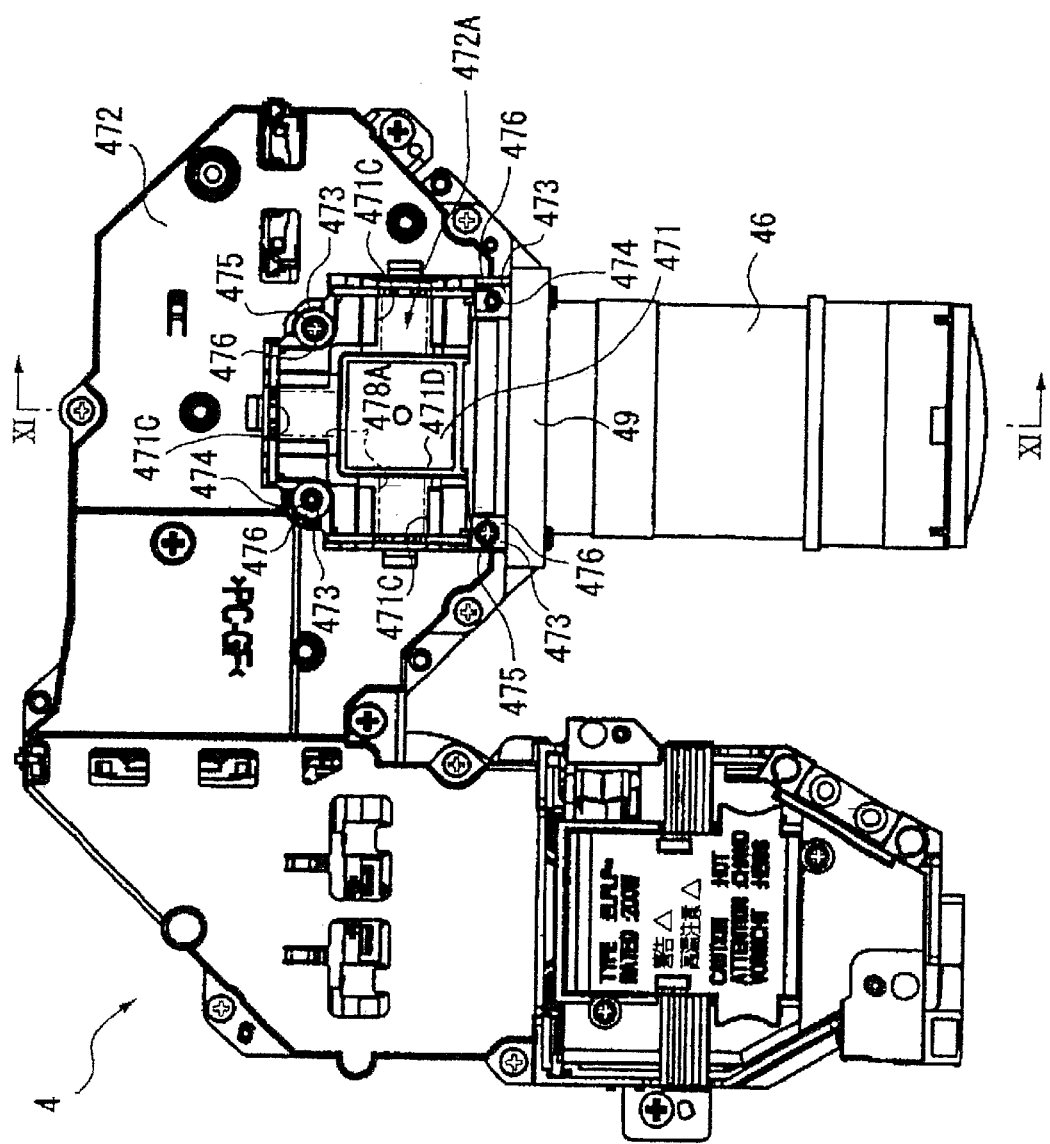

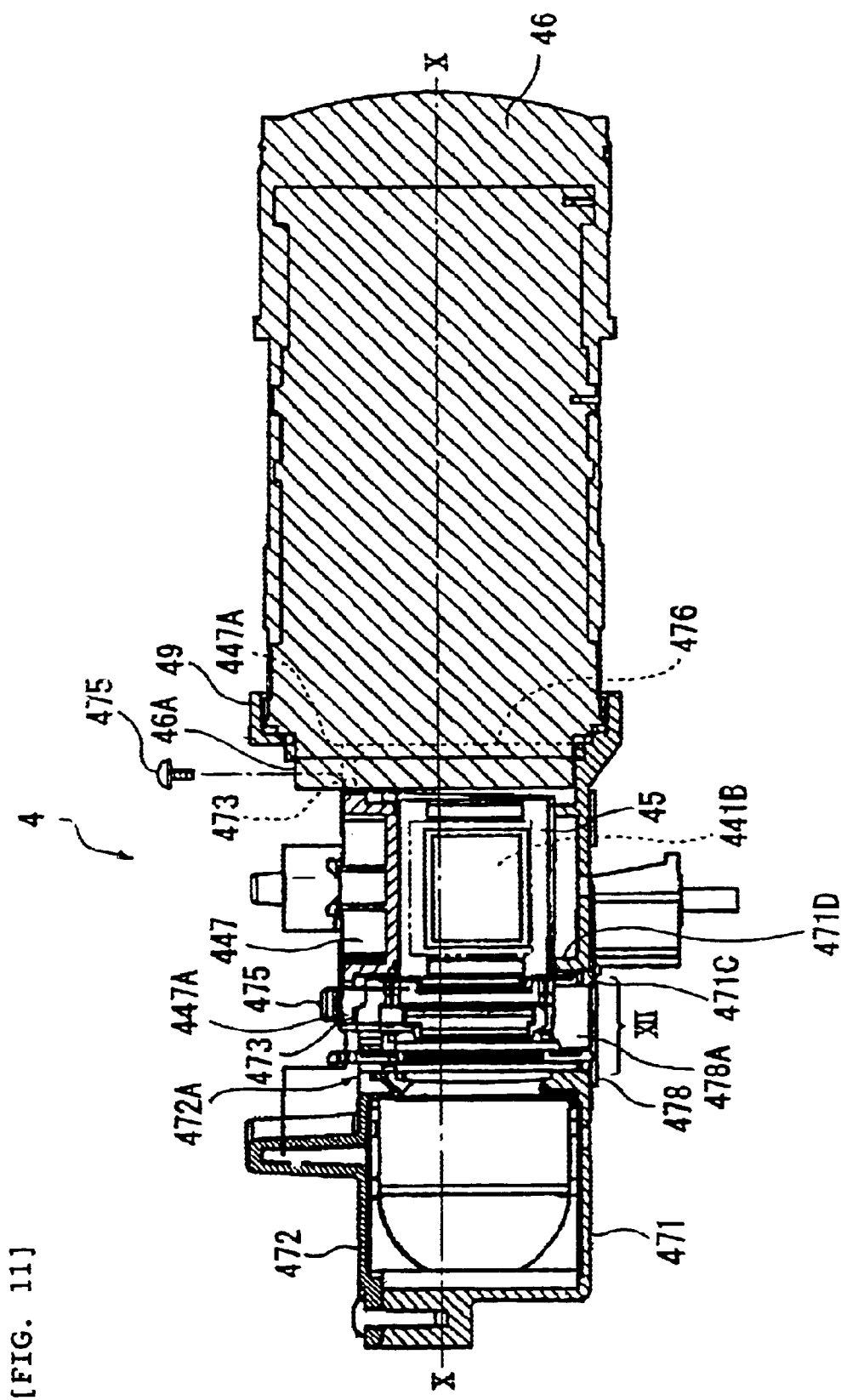
[FIG. 11]

[FIG. 12]
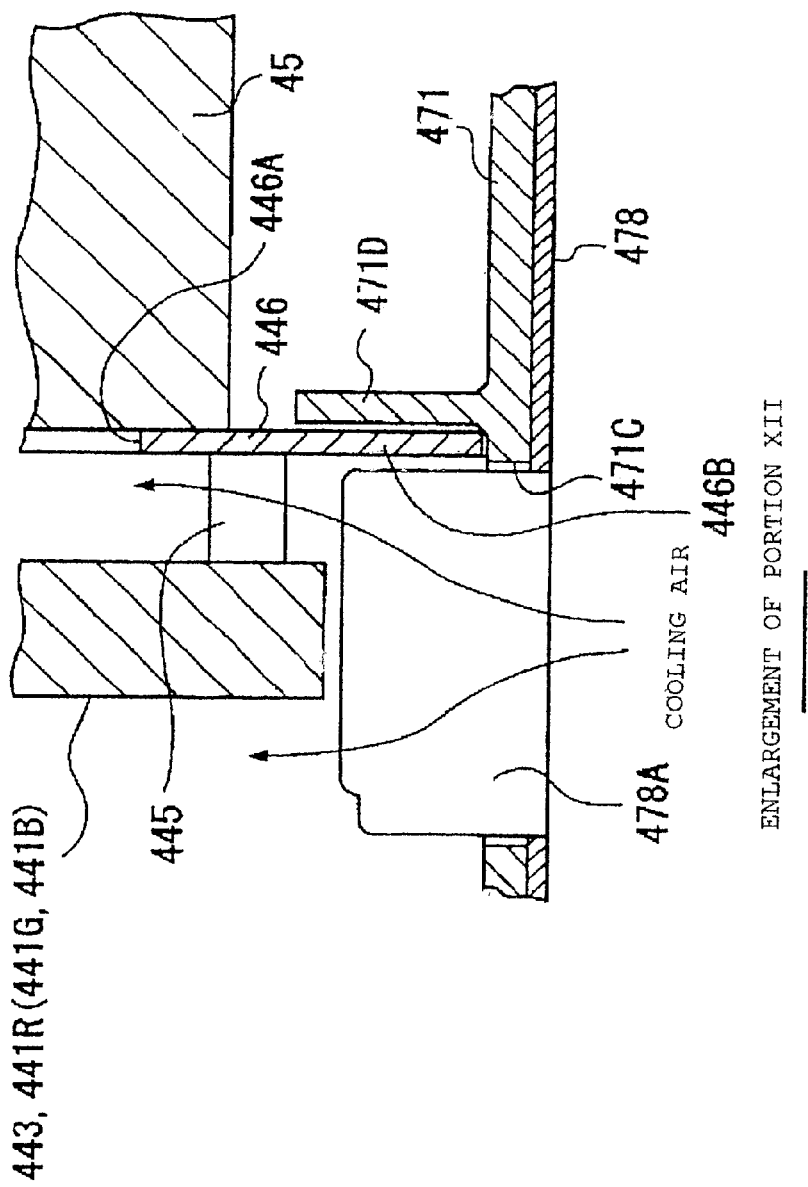

[FIG. 13]
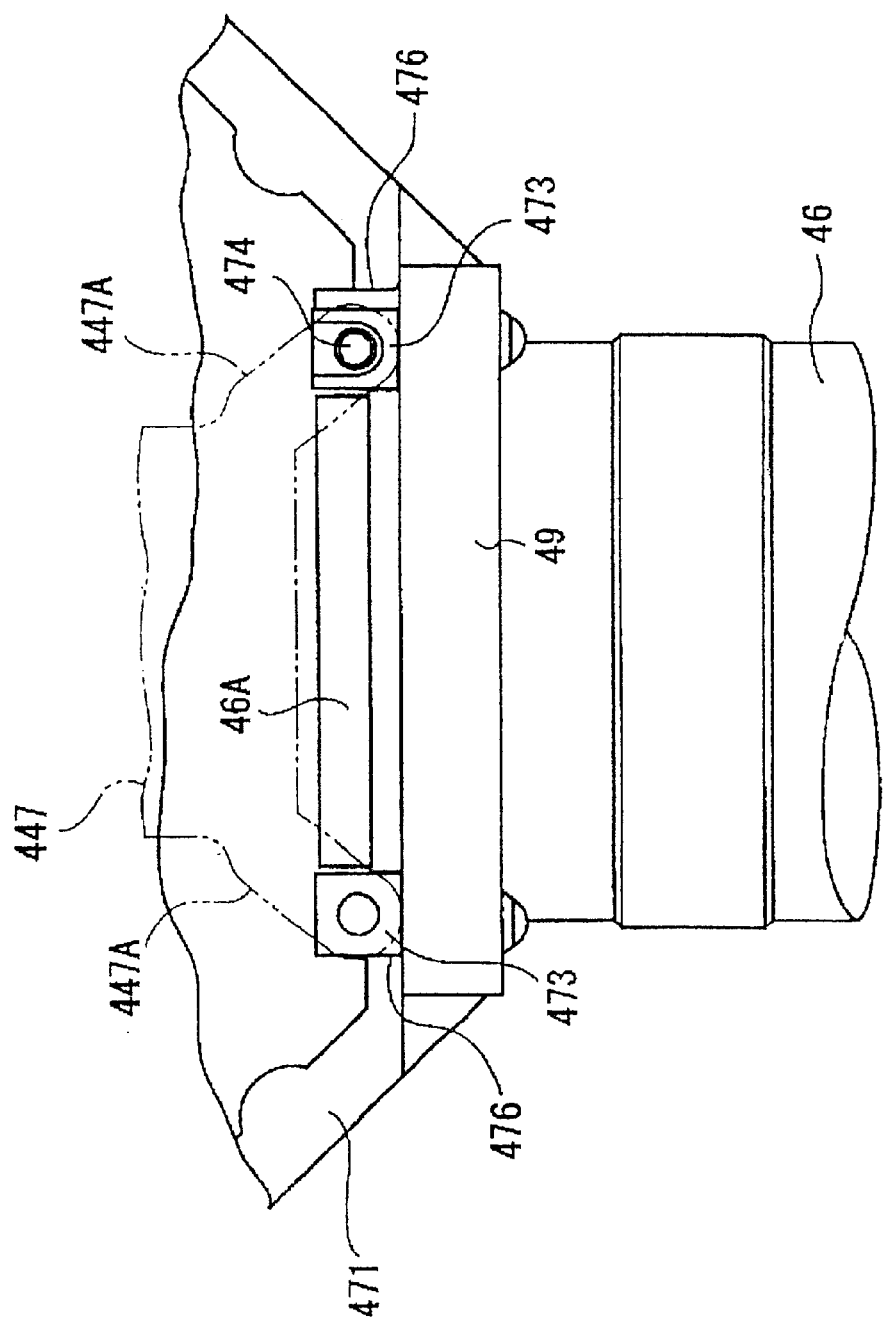

OPTICAL PART MOUNTING STRUCTURE AND PROJECTOR

BACKGROUND OF THE INVENTION

1. Field of Invention

The present invention relates to an optical part mounting structure for mounting an optical part that includes a light-modulating device that modulates a colored light beam in accordance with image information, and a prism that synthesizes the colored light beam modulated by the light-modulating device, integrally formed, to a mounting portion of a housing through a mounting member. The invention also relates to a projector using this mounting structure.

2. Description of Related Art

A related art three-plate-type projector projects a color image in enlarged form through a projection lens by separating light beams emitted from a light source into light beams of three different colors, RGB, using a dichroic mirror, by modulating each colored light beam using three liquid crystal panels in accordance with image information, and by synthesizing the modulated light beams using a cross dichroic prism.

In order for such a projector to provide a clearer projected image, it is necessary to prevent pixel shifts between each liquid crystal panel and deviation in distance from the projection lens. Therefore, in producing such a projector, the three-dimensional position of each of the liquid crystal panels with respect to the cross dichroic prism must be adjusted with high precision.

For this reason, in the related art, the three liquid crystal panels with the positions thereof adjusted with high precision and the cross dichroic prism have been handled as an integrally formed optical part, and this integrally formed optical part has been mounted to a light guide serving as a housing.

As the mounting structure for this case, a structure has been used in which a mounting member that is cross-shaped in plan view is previously mounted to the lower surface of the cross dichroic prism by, for example, bonding, and the mounting member is mounted to the bottom surface of the light guide by, for example, screwing; that is, a structure in which the entire optical part is mounted to the bottom surface inside the housing through this mounting member.

However, when some defects occur in the liquid crystal panels of the projector which has been shipped/sold as a product, for some reason, such as excessively harsh use thereof, the liquid crystal panels need to be replaced. Accordingly, the projector that is adjusted as described above is brought to, for example, a plant, and the entire optical part is pulled out from the light guide in order to replace it with a new optical part that has the positions of its liquid crystal panels and the cross dichroic prism adjusted with respect to each other.

SUMMARY OF THE INVENTION

However, in order to pull out the optical part from the light guide, it is necessary to loosen and remove the screw that is screwed to the bottom surface of the light guide, for example, with a driver. Therefore, the driver inserted to the bottom side may contact other optical parts, such as a lens that is inside of the light guide, so that the replacement operation must be performed with sufficient care, thereby making the operation troublesome.

The cross-shaped mounting member mounted to the lower surface of the cross dichroic prism is such that its screwed portion in plan view extends outwardly from the optical part. Therefore, when pulling out the optical part, the extending portion of the mounting member may also contact other optical parts, so that operation efficiency is further reduced during the replacement.

It is an object of the present invention to provide an optical part mounting structure which makes it possible to easily replace an optical part including a light-modulating device and a prism. It is also an object of the invention to provide a projector utilizing such a mounting structure.

The present invention provides an optical part mounting structure to mount an optical part that includes a light-modulating device that modulates a colored light beam in accordance with image information, and a prism that synthesizes the colored light beam modulated by the light-modulating device, integrally provided, to mounting portions of a housing through a mounting member. The mounting member is removable along with the optical part from the housing and mounted to the mounting portions of the housing at a location situated forwardly of the optical part in a mounting and removing direction.

In such an invention, the mounting member that mounts the optical part including a light-modulating device and a prism is mounted at mounting portions situated forwardly of the optical part in the mounting and removing direction (the side closer to a person replacing the optical part), that is, at a location close to a surface of the housing. Therefore, for example, when the mounting member is screwed, in order to loosen and/or remove the screw, it is not necessary to insert a tool, such as a driver, to the inside of the housing, so that the problem does not arise in that the tool may come into contact with other optical parts inside the housing.

In addition, since the mounting member is provided forwardly of the optical part, when pulling out the optical part from the housing, the mounting member will not contact other optical parts inside the housing.

Therefore, during the operation, the tool and mounting member do not interfere with other optical parts, so that the replacement operation becomes easy to perform, thereby addressing or achieving the object of the present invention.

In the optical part mounting structure of the present invention, it is preferred that the light-modulating device be secured to a side surface of the prism through a fixing plate with a gap to circulate cooling air formed between the light-modulating device and the fixing plate, the mounting member be secured to an end surface of the prism that is perpendicular to the side surface, and a side edge of the fixing plate situated at a side opposite to the side where the mounting member is provided extend so as to be close to an inside surface of the housing and be disposed along a peripheral edge of a cooling air circulation opening provided in the housing.

In this structure, since a side edge of the fixing plate is disposed close-by and extends along the cooling air circulation opening, the cooling air that passes through the opening is guided to the extending portion of the fixing plate and passes through the gap between the light-modulating device and the fixing plate, so that cooling efficiency, in particular, at a light-exiting surface side of the light-modulating device is increased.

In the optical part mounting structure of the present invention, it is preferred that the mounting portions of the housing be provided at a plurality of corresponding bosses formed at the housing, and that, among these bosses, a boss disposed at a side of the projection lens that projects an image have a head to secure a projection lens integrally formed therewith, and another boss have a holding portion to hold a different optical part integrally formed therewith.

Since the projection lens is heavier than other optical parts, the head that secures the projection lens is thick in order to provide strength. When such a head is formed at the housing, the housing is prevented from being reduced in size because it has a thick portion. In addition, the holding portion that holds a different optical part inside the housing is required to have a predetermined strength in order not to get easily deformed or damaged when the (different) optical part is mounted, so that the holding portion may become thick, thereby preventing size reduction of the housing.

In contrast to this, in the present invention, such a head and a holding portion are integrally formed with a boss, and are reinforced, so that the housing has sufficient strength without forming them extremely thick, thereby promoting the size reduction of the housing.

In the optical part mounting structure of the present invention, it is preferred that a light-incident-side end portion of the projection lens pass through the head and project towards the optical part, and that a mounting portion at the boss formed integrally with the head be positioned on both sides of the projection lens in a radial direction thereof, and be provided forwardly of a center axis of the projection lens in the mounting and removing direction.

In such a structure, the mounting member mounted to the mounting portion and an end portion of the projection lens projecting from the head do not interfere with each other, so that the strength of the mounting member can be enhanced by increasing its size, thereby making it possible to increase the supporting strength of the optical part.

In addition, by causing an end portion of the projection lens to project from the head, the projection lens and the prism are disposed closer to each other. Therefore, when the resolution is the same, the projected image becomes brighter. On the contrary, when the brightness is the same, the resolution is increased. Further, it is possible to decrease the projection distance.

The present invention provides a projector including a plurality of light-modulating devices, each of which modulates corresponding one of a plurality of colored light beams in accordance with image information; a prism which synthesizes the colored light beams each modulated by corresponding one of the light-modulating devices; a projection optical system which forms a projected image by enlarging and projecting the colored light beams synthesized by the prism; and a housing that mounts an optical part including the light-modulating devices and the prism. The projector further includes any one of the above-described optical part mounting structures.

According to this present invention, by providing any one of the optical part mounting structures in the projector, as described above, the object of the present invention is addressed or achieved, and the other operational advantages described above are similarly obtained.

BRIEF DESCRIPTION OF THE DRAWINGS

FIG. 1 is a perspective view of the entire projector of an embodiment of the present invention viewed from above;

FIG. 2 is a perspective view of the entire projector viewed from below;

FIG. 3 is perspective view of the interior of the projector, and specifically illustrates the projector resulting from removing an upper case from the projector in the state shown in FIG. 1;

FIG. 4 is perspective view of the interior of the projector, and specifically illustrates the projector resulting from removing a shield plate, a driver board, and an upper light guide from the projector in the state shown in FIG. 3, viewed from the back thereof;

FIG. 5 is perspective view of the interior of the projector, and specifically illustrates the projector resulting from removing an optical unit from the projector in the state shown in FIG. 4;

FIG. 6 is a perspective view of the optical unit viewed from below;

FIG. 7 is a plan view schematically showing the optical systems of the projector;

FIG. 8 is a perspective view of an optical part in which liquid crystal panels and a prism are integrally formed viewed from below;

FIG. 9 is a perspective view showing the location where the optical part is mounted to a lower light guide;

FIG. 10 is a plan view of the optical unit;

FIG. 11 is a sectional view taken along plane XI—XI of FIG. 10;

FIG. 12 is an enlarged view of portion XII shown in FIG. 11; and

FIG. 13 is an enlarged plan view showing the main portion of the optical unit.

DETAILED DESCRIPTION OF PREFERRED EMBODIMENTS

Hereunder, an embodiment of the present invention will be described with reference to the drawings.

[1. Main Structure of Projector]

FIG. 1 is a perspective view of the entire projector 1 of an embodiment viewed from above. FIG. 2 is a perspective view of the entire projector 1 viewed from below. FIGS. 3 to 5 are perspective views of the interior of the projector 1. More specifically, FIG. 3 illustrates the projector 1 resulting from removing an upper case 21 from the projector 1 in the state shown in FIG. 1. FIG. 4 illustrates the projector 1 resulting from removing a shield plate 80, a driver board 90, and an upper light guide 472 from the projector 1 in the state shown in FIG. 3, viewed from the back thereof. FIG. 5 illustrates the projector 1 resulting from removing an optical unit 4 from the projector 1 in the state shown in FIG. 4. Elements 4, 21, 80, 90, and 472, which form the projector, are described in detail below.

In FIGS. 1 to 3, the projector 1 includes an exterior case 2; a power supply unit 3 accommodated inside the exterior case 2; and the optical unit 4 similarly disposed inside the exterior case 2 and being U shaped in plan view. The projector 1 has an overall substantially rectangular parallelepiped shape.

The exterior case 2 includes an upper case 21 and a lower case 23, each of which is formed of resin. The cases 21 and 23 are secured together with a screw.

The upper case 21 includes a top surface portion 211, side surface portions 212 provided at the periphery of the top surface portion 211, a back surface portion 213, and a front surface portion 214.

A lamp cover 24 is fitted to, and removably mounted to, the front side of the top surface portion 211. At the top surface portion 211, a cutaway portion 211A, at which the top surface portion of a projection lens 46 is exposed, is provided beside the lamp cover 24 in order to allow zooming and focusing of the projection lens 46 by a manual operation of a lever. An operation panel 25 is provided behind the cutaway portion 211A.

The front surface portion 214 has a round opening 212A formed continuously with the cutaway portion 211A in the upper case 21. The projection lens 46 is disposed in correspondence with the round opening 212A. At the front surface portion 214, an exhaust opening 212B is disposed forwardly of the power supply unit 3 at the inside so as to be situated at the side opposite to the round opening 212A. An exhaust louver 26 which exhausts cooling air in a direction avoiding an image projection area, that is, towards the left in FIG. 1, and which has a light-shielding function is provided in the exhaust opening 212B (the exhaust louver 26 is actually mounted to the lower case 23).

The lower case 23 includes a bottom surface portion 231, side surface portions 232 provided at the periphery of the bottom surface portion 231, and a back surface portion 233.

A position adjusting mechanism 27, which positions a projected image by adjusting the tilting of the entire projector 1, is formed at the front side of the bottom surface portion 231. A different position adjusting mechanism 28, which adjusts the tilting of the projector 1 in a different direction, is provided at one of the corners of the back side of the bottom surface portion 231, while a rear foot 231A is provided at the other corner thereof. However, the rear foot 231A cannot be used to adjust the position. In addition, a cooling air suction opening 231B is provided in the bottom surface portion 231.

Mount portions 232A that rotatably mount a U-shaped handle 29 thereto are provided at one of the side surface portions 232.

At one of the side surface sides of the exterior case 2, side feet 2A (FIG. 2), which serve as feet for the projector 1 to stand when the handle 29 is moved to the upward side, are provided at the side surface portions 212 and 232 of the corresponding upper case 21 and lower case 23.

An interface 2B, which opens in both the back surface portion 213 of the upper case 21 and the back surface portion 233 of the lower case 23, is provided at the back surface side of the exterior case 2. An interface cover 215 is provided within the interface 2B, and an interface substrate (not shown) having various connectors mounted thereon is such as to be disposed at the inner side of the interface cover 215. A speaker hole 2C and a suction opening 2D, which are provided in both the back surface portions 213 and 233, are provided on both the left and right sides of the interface 2B. Of the speaker hole 2C and the suction opening 2D, the suction opening 2D is positioned behind the power supply unit 3 at the interior.

As shown in FIG. 4, the power supply unit 3 includes a power supply 31 and a lamp drive circuit (ballast) 32 disposed beside the power supply 31.

The power supply 31 provides electrical power supplied through a power supply cable to the lamp drive circuit 32, the driver board 90 (FIG. 3), and the like, and has an inlet connector 33 (FIG. 2) into which the power supply cable is inserted.

The lamp drive circuit 32 supplies electrical power to a light source lamp 411 of the optical unit 4.

As shown in FIGS. 4, 6, and 7, the optical unit 4 optically processes light beams that have exited from the light source lamp 411 in order to form an optical image in correspondence with image information. It includes an integrator illumination optical system 41, a color separation optical system 42, a relay optical system 43, an electro-optical device 44, a cross dichroic prism 45 (FIG. 7) serving as a color synthesizing optical system, and the projection lens 46 serving as a projection optical system.

The power supply unit 3 and the optical unit 4 are covered with the shield plate 80 (FIGS. 3 and 5), formed of aluminum and disposed at the surrounding area including the upper and lower portions. This reduces, minimizes or prevents leakage of electromagnetic noise from, for example, the power supply unit 3 to the exterior.

[2. Detailed Structure of Optical Systems]

In FIGS. 4 and 7, the integrator illumination optical system 41 is an optical system that substantially uniformly illuminates image formation areas of three liquid crystal panels 441 (represented as liquid crystal panels 441R, 441G, and 441B for corresponding colored light beams, red light beams, green light beams, and blue light beams) of the electro-optical device 44. The integrator illumination optical system 41 includes a light source device 413, a first lens array 418, a second lens array 414 including a UV filter, a polarization conversion element 415, a first condenser lens 416, a reflective mirror 424, and a second condenser lens 419.

Of these component parts, the light source device 413 includes the light source lamp 411 serving as a radiating light source that causes light beams to exit radially, and a reflector 412 which reflects the radial light beams that have exited from the light source lamp 411. A halogen lamp, a metal halide lamp, or a high-pressure mercury lamp are examples of lamps that are often used as the light source lamp 411. A parabolic mirror is used as the reflector 412. Besides a parabolic mirror, a collimator lens (concave lens) as well as an ellipsoidal mirror may also be used.

The first lens array 418 has a structure in which small lenses having contours substantially rectangular when viewed from the optical axis direction are disposed in a matrix arrangement. Each of the small lenses divides the light beams which exit from the light source lamp 411 into a plurality of partial light beams. The shape of the contour of each small lens is set so as to be substantially the same as the shape of the image formation area of each liquid crystal panel 441. For example, if the aspect ratio of the image formation area of each liquid crystal panel 441 (the ratio between the horizontal and vertical dimensions) is 4 to 3, then the aspect ratio of each of the small lenses is also set at 4 to 3.

The structure of the second lens array 414 is substantially the same as that of the first lens array 418, and has small lenses disposed in a matrix arrangement. Along with the first condenser lens 416 and the second condenser lens 419, the second lens array 414 functions to focus an image formed by each of the small lenses of the first lens array 418 on each of the liquid crystal panels 441.

The polarization conversion element 415 is disposed between the second lens array 414 and the first condenser lens 416, and is formed into an integral unit with the second lens array 414. Such a polarization conversion element 415 converts the light from the second lens array 414 into one type of polarized light beams in order to increase the efficiency in using light at the electro-optical device 44.

More specifically, the partial light beams converted into one type of polarized light beams by the polarization conversion element 415 are at the end substantially superimposed on the liquid crystal panels 441R, 441G, and 441B of the electro-optical device 44 by the first condenser lens 416 and the second condenser lens 419. In the projector 1 (electro-optical device 44) of the embodiment using the liquid crystal panels 441 of the type that modulates polarized light beams, only one type of polarized light beams can be used, so that about half of the light from the light source lamp 411 that emits other types of random polarized light beams is not used.

To address or overcome this problem, by using the polarization conversion element 415, the light beams exiting from the light source lamp 411 are all converted into one type of polarized light beams in order to increase the efficiency in using light at the electro-optical device 44. Such a polarization conversion element 415 is introduced in, for example, Japanese Unexamined Patent Application Publication No. 8-304739.

The color separation optical system 42 includes two dichroic mirrors 421 and 422, and a reflective mirror 423. By using the dichroic mirrors 421 and 422, it functions to separate the plurality of partial light beams emitted from the integrator illumination optical system 41 into colored light beams of three different colors, red, green, and blue.

The relay optical system 43 includes a light-incident-side lens 431, a relay lens 433, and reflective mirrors 432 and 434. It functions to guide colored light beams separated at the color separation optical system 42, that is, the blue light beams, to the liquid crystal panel 441B.

Here, the blue light component and the green light component of the light beams emitted from the integrator illumination optical system 41 pass through the dichroic mirror 421 of the color separation optical system 42, whereas the red light component is reflected thereby. The red light reflected by the dichroic mirror 421 is reflected by the reflective mirror 423, passes through a field lens 417, and reaches the red-light liquid crystal panel 441R. The field lens 417 converts each of the partial light beams emitted from the second lens array 414 into light beams that are parallel to the center axis thereof ("chief ray"). Field lenses 417 provided at the light-incident sides of the other liquid crystal panels 441G and 441B function in a similar manner.

Of the blue light and green light that have passed through the dichroic mirror 421, the green light is reflected by the dichroic mirror 422, passes through the corresponding field lens 417, and reaches the green-light liquid crystal panel 441G. On the other hand, the blue light passes through the dichroic mirror 422, passes through the relay optical system 43, passes through the corresponding field lens 417, and reaches the blue-light liquid crystal panel 441B. Since the length of the optical path for the blue light is longer than the lengths of the optical paths for the light of the other colors, the relay optical system 43 is used for the blue light in order to prevent decrease of efficiency in using light, for example, due to diffusion of light. In other words, the relay optical system 43 is used for the blue light in order to transmit the partial light beams incident upon the light-incident-side lens 431 as they are to the corresponding field lens 417.

The electro-optical device 44 includes the liquid crystal panels 441R, 441G, and 441B as three light-modulating devices. These liquid crystal panels 441R, 441G, and 441B use, for example, polysilicon TFT as switching elements. The colored light beams separated at the color separation optical system 42 are modulated in accordance with image information by the three corresponding liquid crystal panels 441R, 441G, and 441B in order to form optical images.

The cross dichroic prism 45 synthesizes the images formed by the modulating operation performed with each of the colored light beams emitted from the three liquid crystal panels 441R, 441G, and 441B in order to form a color image. The cross dichroic prism 45 includes a dielectric multilayer film that reflects red light and a dielectric multilayer film that reflects blue light that are formed in a substantially X shape along the interfaces of four right angle prisms. These dielectric multilayer films synthesize the colored light beams of the three different colors. The color image synthesized by the cross dichroic prism 45 exits from the projection lens 46 and is projected in enlarged form onto a screen.

As shown in FIGS. 4 and 6, each of the above-described optical systems 41 to 45 is accommodated inside a synthetic resin light guide 47 serving as a housing for the optical parts.

The light guide 47 includes a lower light guide 471 having grooves used to fit in the above-described optical parts 414 to 419, 421 to 423, and 431 to 434, respectively, from thereabove by sliding them, and a cover-shaped upper light guide 472 that covers the open side of the top portion of the lower light guide 471.

A head 49 is formed at the light-exiting side of the light guide 47. The projection lens 46 is secured to the front side of the head 49, while the cross dichroic prism 45, having the liquid crystal panels 441R, 441G, and 441B mounted thereto, is secured to the back side of the head 49.

[3. Cooling Structure]

The projector 1 of the embodiment includes a panel cooling system A which primarily cools the liquid crystal panels 441R, 441G, and 441B; a lamp cooling system B which primarily cools the light source lamp 411; and a power supply cooling system C which primarily cools the light source 31.

In FIGS. 2, 4, and 5, in the panel cooling system A, a pair of sirocco fans 51 and 52, disposed on both sides of the projection lens 46, are used. Cooling air sucked by the sirocco fans 51 and 52 from the suction opening 231B at the bottom surface cools the liquid crystal panels 441R, 441G, and 441B from the downward side to the upward side, and then is pulled towards the side of an axial-flow exhaust fan 53 at a front corner while cooling the bottom surface of the driver board 90 (FIG. 3). Then, the cooling air is exhausted from the exhaust opening 212B at the front surface side.

In FIGS. 4 to 6, in the lamp cooling system B, a sirocco fan 54, disposed at the bottom surface of the optical unit 4, is used. Cooling air inside the projector 1 pulled towards and by the sirocco fan 54 moves into the light guide 47 from an open portion (not shown) formed in the upper light guide 472, passes through the second lens array 414 and the polarization conversion element 415, which are formed into a unit, while cooling them. Thereafter, the cooling air exits from an exhaust-side opening 471A in the lower light guide 471 and is sucked by the sirocco fan 54 so as to be discharged. The discharged cooling air re-enters into the inside of the light guide 47 from the suction-side opening 471B in the lower light guide 471, cools the light source lamp 411 in the light source device 413, and, then, exits from the light guide 47 so as to be exhausted from the exhaust opening 212B by the axial-flow exhaust fan 53.

In FIG. 4, in the power supply cooling system C, an axial-flow suction fan 55, disposed behind the power supply 31, is used. Cooling air sucked by the axial-flow suction fan 55 from the suction opening 2D at the back surface side cools the power supply 31 and the lamp drive circuit 32, and, then, as in the cooling systems A and B, is exhausted from the exhaust opening 212B by the axial-flow exhaust fan 53.

[4. Optical Part Mounting Structure]

Hereunder, with reference to FIGS. 8 to 13, a detailed description of the optical part mounting structure will be provided.

In the embodiment, an optical part in accordance with the present invention refers to the integrally formed cross dichroic prism 45 and the liquid crystal panels 441R, 441G, and 441B. Different optical parts refer to the field lenses 417, the dichroic mirrors 421 and 422, the light-incident-side lens 431, the relay lens 433, and the like, shown in FIGS. 4 and 7.

First, as shown in FIG. 8, each of the liquid crystal panels 441R, 441G, and 441B is accommodated inside its corresponding holding frame 443. By inserting transparent resin pins 445, along with ultraviolet ray curing adhesive, into holes 443A formed in four corners of each holding frame 443, the liquid crystal panels 441R, 441G and 441B are bonded to the light-beam incident surface sides, that is, side surfaces of the cross dichroic prism 45 through metallic fixing plates 446 (that is, they are secured to the cross dichroic prism 45 by what is referred to as a "POP" (panel on prism) structure.

Here, rectangular open portions 443B are formed in the holding frames 443. The liquid crystal panels 441R, 441G, and 441B are exposed at the open portions 443B, and the exposed portions form the image formation areas. Each of the colored light beams, the R, G, and B light beams, travels to the exposed portion of each of the liquid crystal panels 441R, 441G, and 441B, respectively, in order to form an optical image in accordance with the image information.

The fixing plates 446 are directly bonded to the light-beam incident surfaces of the cross dichroic prism 45, for example, with an adhesive, and their outer peripheral shapes are slightly larger than the corresponding light-beam incident surfaces. The pins 445 are attached to the portions of the fixing plates 446 that protrude from the light-beam incident surfaces of the cross dichroic prism 45. By this structure, the holding frames 443 can be secured to the cross dichroic prism 45 side without making the cross dichroic prism 45 larger than necessary. Open portions 446A (FIG. 12), corresponding to the open portions 443B of the holding frames 443, are formed in the fixing plates 446 so that the light beams from the liquid crystal panels 441R, 441G, and 441B are incident upon the cross dichroic prism 45.

The optical part including the liquid crystal panels 441R, 441G, and 441B, and the cross dichroic prism 45 that are integrally formed by the POP structure, is, as shown in FIG. 9, secured to mounting portions 473 of the lower light guide 471 through mounting members 447 bonded to the top surface (that is, the surface perpendicular to the light-beam incident surfaces) of the cross dichroic prism 45.

The mounting members 447 include four arms 447A that extend in four directions in plan view. Of round holes 447B formed in the corresponding arms 447A, the two round holes 447B that are disposed substantially on a diagonal are fitted to positioning protrusions 474 (also shown in FIG. 13) provided at the corresponding mounting portions 473. Screws 475 that are screwed into the corresponding mounting portions 473 are inserted into the remaining two round holes 447B. A suitable gripping portion is provided at the square portion at the center of the mounting members 447 so that a worker can easily grip them during mounting and removing operation.

Adjustments of the three-dimensional positions of the liquid crystal panels 441R, 441G, and 441B with respect to the cross dichroic prism 45 are previously performed, with the mounting members 447 being secured to the cross dichroic prism 45.

On the other hand, the mounting portions 473 of the lower light guide 471 are provided at the top portions of four cylindrical or prismatic bosses 476 that are continuously formed substantially vertically on the lower light guide 471. Therefore, with the mounting members 447 being mounted to the mounting portions 473, the liquid crystal panels 441R, 441G, and 441B and the cross dichroic prism 45 are disposed in a state of suspension below the mounting members 447, and are accommodated being slightly suspended above the bottom surface of the lower light guide 471 inside the light guide 47.

In such lower light guide 471, the head 49 that secures the projection lens 46 is provided integrally with the two bosses 476 beside the projection lens 46, so that even if the heavy projection lens 46 is secured to the head 49, the head 49 is reinforced by the bosses 476 so as not to tilt.

A plurality of holding portions 477 (some of the holding portions 477 are shown in FIGS. 4 and 9 as representing the plurality of holding portions 477) are provided in a vertical direction at the two bosses 476 disposed away from the projection lens 46 side. The grooves used to fit the field lenses 417, the dichroic mirrors 421 and 422, the light-incident-side lens 431, and the relay lens 433 therein are such as to be formed between the pairs of holding portions 477 that are disposed close to each other. In other words, by integrally forming the holding portions 477 and the corresponding bosses 476, they are reinforced by the bosses 476.

As shown in FIGS. 6 and 10, suction side openings 471C are formed in three locations of the bottom surface of the lower light guide 417 in correspondence with the liquid crystal panels 441R, 441G, and 441B. The liquid crystal panels 441R, 441G, and 441B are cooled by the cooling air at the panel cooling system A (FIGS. 2 and 5) that flows into the light guide 47 from these suction side openings 471C.

Here, a rectifying plate 478 having a substantially triangular plate shape in plan view is provided at the bottom surface of the lower light guide 471, and, as shown in FIGS. 9 to 12, is such that pairs of (a total of six) upstanding portions 478A of the rectifying plate 478 protrude upward from the suction side openings 471C. It is noted that, however, in FIG. 10, the upstanding portions 478A are shown by alternate long and two short dashed lines.

By the upstanding portions 478A, the flow of the cooling air for cooling the liquid crystal panels 441R, 441G, and 441B is rectified from the downward side to the upward side.

In FIG. 10, extending portions 446B are formed by extending the side edges of the fixing plates 446 downward. The extending portions 446B are disposed each close to one of the peripheral edges of its corresponding suction side opening 471C that is situated at the corresponding side of the cross dichroic prism 45 and that is parallel to the corresponding light-beam incident surface of the cross dichroic prism 45. By being disposed along the corresponding one of the peripheral edges of each of the suction side openings 471C, each extending portion 446B functions as a rectifying plate. For this reason, a portion of the cooling air of the panel cooling system A is guided to the extending portions 446B, and flow into the gap between the liquid crystal panels 441R, 441G, and 441B and the cross dichroic prism 45 without leaking from the gap between the bottom surface of the lower light guide 471 and the cross dichroic prism 45.

The upstanding portions 471D, which stand up from the bottom surface of the lower light guide 471, are positioned at the back surface sides (the cross dichroic prism 45 side) of such extending portions 446B. Superposing the upstanding portions 471D and the extending portions 446B makes it even more difficult for the cooling air to escape.

On the other hand, as shown in FIG. 10, cutaway openings 472A are formed in portions of the upper light guide 472 in correspondence with the locations of the liquid crystal panels 441R, 441G, and 441B, and the cross dichroic prism 45. The mounting portions 473 at the lower light guide 471 are exposed from the cutaway openings 472A. In other words, by previously securing the liquid crystal panels 441R, 441G, 441B, and the cross dichroic prism 45 to the mounting members 447, even when the upper light guide 472 is mounted to the lower light guide 471, it is possible to mount or remove the mounting members 447 to and from the mounting portions 473.

The mounting portions 473, which are provided at the bosses 476 formed integrally with the head 49, are positioned above a center axis X—X of the projection lens 46 shown in FIG. 11. Therefore, as shown in FIG. 13, although in plan view two arms 447A of the mounting members 447 overlap the outer periphery of an end portion 46A of the projection lens 46 protruding from the head 49 towards the cross dichroic prism 45, they do not essentially interfere with each other.

Such an embodiment provides the following advantages.

(1) In the projector 1, the optical part including the liquid crystal panels 441R, 441G, and 441B, and the cross dichroic prism 45 that are integrally formed, is mounted to the lower light guide 471 so as to be removable through the mounting members 447. Here, the optical part is secured in a suspended state from the mounting members 447, and the mounting members 447 are mounted to the mounting portions 473 at the top portions of the bosses 476 disposed forwardly of the optical part in the mounting and removing direction. Therefore, when replacing the optical part, it is no longer necessary to insert a driver into the light guide 47 to remove or re-screw the screws 475. Consequently, it is not necessary to be concerned with scratching, for example, the field lenses 417 accommodated inside the light guide 47 with the driver, thereby making it easy to perform the replacement operation from above the light guide 47.

(2) Since the mounting members 447 are provided forwardly, in performing the replacement operation, the arms 447A of the mounting members 447 extending in four directions will not bump into, for example, the field lenses 417 inside the light guide 47, so that, in this respect also, the replacement operation can easily be performed.

(3) Since the arms 447A of the mounting members 447 are not accommodated inside the light guide 47, the arrangement space around the liquid crystal panels 441R, 441G, and 441B can be made small, so that it is possible to reduce the size of the optical unit 4 including the light guide 47.

(4) Since the bosses 476 adjacent to the projection lens 46 are formed integrally with the head 49, the head 49 can be reinforced by these bosses 476. Even when the head 49 is made correspondingly thinner, it is possible to prevent it from falling down when it is secured to the projection lens 46, and to promote size reduction of the light guide 47 and the optical unit 4 by making the head 49 thinner.

(5) The holding portions 477 that hold different optical parts, such as the field lenses 417, the dichroic mirrors 421 and 422, the light-incident-side lens 431, and the relay lens 433, are also reinforced by being integrally formed with the bosses 476 that are disposed away from the projection lens 46, so that the holding portions 477 can be made thin and the wall thicknesses about the holding portions 477 can be made small. Therefore, in this respect also, it is possible to reduce the size of the optical unit 4.

(6) The mounting portions 473 at the top portions of the bosses 476 formed integrally with the head 49 are positioned on both sides of the projection lens 46 in a radial direction and are provided so as to be disposed away from and so as to be above the center axis X—X of the projection lens 46 (that is, forwardly of the center axis X—X in the mounting and removing direction). Therefore, when the mounting members 447 are mounted to such mounting portions 473, the arms 447A of the mounting members 447 and the end portion 46A of the projection lens 46 passing completely through and projecting from the head 49 do not interfere with each other, so that the widths and thicknesses of the arms 447A can be made correspondingly large, thereby making it possible to increase the supporting strength of the liquid crystal panels 441R, 441G, 441B, and the cross dichroic prism 45.

Since the end portion 46A of the projection lens 46 projects from the head 49 and is disposed closer to the cross dichroic prism 45, if the resolution is the same, the projected image can be made brighter, whereas, if the brightness is the same, the resolution can be increased. In addition, the projection distance can be made shorter.

(7) Since the extending portions 446B of the fixing plate 446, secured to the cross dichroic prism 45, are disposed, each one being close to one peripheral edge of its corresponding suction side opening 471C provided in the bottom surface of the lower light guide 471, and each one extending along the one peripheral edge of its corresponding suction side opening 471C, the extending portions 446B can function as rectifying plates. For this reason, a portion of the cooling air of the panel cooling system A is guided to the extending portions 446B, and can be made to reliably flow into the gap between the liquid crystal panels 441R, 441G, and 441B, and the cross dichroic prism 45, so that, in particular, the light-exiting-side surfaces of the liquid crystal panels 441R, 441G, and 441B can be efficiently cooled.

(8) Since the upstanding portions 478A of the rectifying plate 478 protrude upward from the suction side openings 471C, cooling air can be reliably guided from the downward side to the upward side towards the liquid crystal panels 441R, 441G, and 441B, so that leakage of cooling air into the light guide 47 can be restricted, thereby making it possible to more efficiently cool the liquid crystal panels 441R, 441G, and 441B.

(9) Since the mounting members 477 do not exit between the lower surface of the cross dichroic prism 45 and the bottom surface of the lower guide 471, the liquid crystal panels 441R, 441G, and 441B can be brought close to the suction side openings 471C, so that the cooling efficiency thereof can be further increased.

The present invention is not limited to the above-described embodiment, so that the present invention encompasses, for example, other structures which can achieve the object of the present invention. The present invention also encompasses, for example, modifications such as those described below.

For example, although in the above-described embodiment the downwardly extending extending portions 446B are provided at the fixing plate 446, and function as rectifying plates, such extending portions 446B are provided when necessary, so that they can be omitted. When such extending portions 446B are not provided, cooling air is guided only by the upstanding portions 471D provided at the bottom surface of the lower light guide 471. However, by such extending portions 446B used in the embodiment, it is possible to prevent leakage of cooling air, so that it is preferable to provide the extending portions 446B.

Although the head 49 and the holding portions 477 are provided integrally at the bosses 476, they may be separately provided in the present invention.

The mounting portions in accordance with the present invention do not need to be provided on the bosses 476. They may be provided at any locations such as portions of the top end surface of the lower light guide 471 and may be formed with any shapes.

The mounting members may be formed with any shapes, so that their shapes are not limited to the shapes used in the embodiment.

Although in the embodiment the optical part formed by the liquid crystal panels 441R, 441G, and 441B, and the cross dichroic prism 45 has a structure which allows it to be mounted and removed in the vertical direction along with the mounting members 447, such optical part can be mounted and removed in any direction in the present invention. Any structure may be used as long as the mounting members are provided forwardly in the mounting and removing direction, and the optical part is provided backwardly in the mounting and removing direction. Therefore, for example, when the mounting members 447 are provided at the lower surface side of the cross dichroic prism 45, the liquid crystal panels 441R, 441G, and 441B, and the cross dichroic prism 45 may be constructed so as to be removable from the lower surface side of the lower light guide 471 along with the mounting members 47.

Although in the embodiment only a projector using three light-modulating devices is given as an example, the present invention may be applied to a projector using only one, two light-modulating devices, or four or more light-modulating devices.

Although in the embodiment liquid crystal panels are used as light-modulating devices, light-modulating devices other than liquid crystal panels, such as devices using micromirrors, may be used.

Although in the embodiment, transmissive light-modulating devices whose light-incident surfaces and light-exiting surfaces differ are used, reflective light-modulating devices whose light-incident surfaces and light-exiting surfaces are the same may be used.

Although, in the embodiment, only a front-type projector which performs projection from the direction where to observe a screen is provided as an example, the present invention may be applied to a rear-type projector which performs a projection operation from a side opposite to the direction where to observe a screen.

Advantages

As can be understood from the foregoing description, the present invention makes it possible to easily replace an optical part including light-modulating devices and a prism.

What is claimed is:

1. An optical part mounting structure that mounts an optical part that includes a light-modulating device that modulates a colored light beam in accordance with image information and a prism that synthesizes the colored light beam modulated by the light-modulating device, integrally provided, to mounting portions of a housing, comprising:

a mounting member including a first and second set of arms, the light modulating device and the prism being integrally provided to the mounting portions of the housing through the mounting member, the mounting member being removable along with the optical part from the housing and mounted to the mounting portions of the housing using the arms, the first set being situated forwardly of the optical part and the second set being situated opposed to the first set, so as to suspend at least a portion of the light modulating device.

2. The optical part mounting structure according to claim 1, the light-modulating device being secured to a side surface of the prism through a fixing plate, with a gap that circulates cooling air being formed between the light-modulating device and the fixing plate, the mounting member being secured to an end surface of the prism that is perpendicular to the side surface, and a side edge of the fixing plate situated at a side opposite to the side where the mounting member is provided extending so as to be close to an inside surface of the housing and being disposed along a peripheral edge of a cooling air circulation opening provided in the housing.

3. The optical part mounting structure according to claim 1, the mounting portions of the housing being provided at a plurality of corresponding bosses formed at the housing, and, among bosses, a boss disposed at a side of a projection lens that projects an image having a head that secures the projection lens integrally formed therewith, and another boss having a holding portion that holds a different optical part integrally formed therewith.

4. The optical part mounting structure according to claim 3, a light-incident-side end portion of the projection lens passing through the head and projecting towards the optical part, and a mounting portion at the boss formed integrally with the head being positioned on both sides of the projection lens in a radial direction thereof, and being provided forwardly of a center axis of the projection lens in the mounting and removing direction.

5. A projector, comprising:

an optical part including a plurality of light-modulating devices, each of the light modulating devices modulating corresponding one of a plurality of colored light beams in accordance with image information, and a prism which synthesizes the colored light beams that are each modulated by the corresponding one of the light-modulating devices;

a projection optical system which forms a projected image by enlarging and projecting the colored light beams that are synthesized by the prism;

a housing that mounts the optical part that includes the light-modulating devices and the prism; and the optical part mounting structure of claim 1.

* * * * *